United States Patent [19]

Sardo

[11] 3,924,381

[45] Dec. 9, 1975

[54] SYSTEM FOR THE HANDLING OF FRUITS AND VEGETABLES

[75] Inventor: Alberto Carmelo Sardo, Sceaux, France

[73] Assignee: Pennwalt Corporation, Philadelphia, Pa.

[22] Filed: Apr. 11, 1975

[21] Appl. No.: 567,211

[30] Foreign Application Priority Data

Apr. 18, 1974 Italy .................................. 50471/74

[52] U.S. Cl. .......................... 53/3; 53/35; 53/137;
       53/167; 209/74; 302/14
[51] Int. Cl.² ...................... B65B 35/00; B65C 1/00
[58] Field of Search .................. 53/3, 35, 137, 167;
       302/14; 198/31 AO; 209/74 R, 83, 85, 123;
       134/63

[56] References Cited
UNITED STATES PATENTS

| | | |
|---|---|---|
| 1,278,547 | 9/1918 | Yandle .................................. 134/63 |
| 1,478,534 | 12/1923 | Schwartz ........................... 302/14 X |
| 3,241,650 | 3/1966 | Horton ............................. 209/123 X |
| 3,651,940 | 3/1972 | Rooke ............................... 209/74 R |
| 3,786,917 | 1/1974 | Rousselie et al. .................... 209/123 |

*Primary Examiner*—Travis S. McGehee
*Assistant Examiner*—J. Sipos
*Attorney, Agent, or Firm*—Charles N. Quinn

[57] ABSTRACT

This invention relates to an improved system for the handling of fruits and vegetables. More particularly, the present invention relates to a system for the handling of fruits and vegetables, designated generally as produce, which has a feature structure allowing the optional temporary storage and recirculation of produce which has been allotted to different classes on the basis of quality, in order to render more economical the operations of selecting treating, packaging etc. of the produce. The structure of the present invention can be utilized generally for the treatment and handling of nearly every kind of fruit and vegetable.

8 Claims, 3 Drawing Figures

SYSTEM FOR THE HANDLING OF FRUITS AND VEGETABLES

DESCRIPTION OF THE PRIOR ART

In the past, fruits and vegetables have largely been handled on an individual basis, being produced and shipped to market by individual growers. Many times the individual growers would have their own stores or outlets through which they would sell their agricultural products and hence the gathering together of large amounts of fruits and vegetables, commonly designated by the general term "produce", was not necessary.

Economic and industrial progress applied to the food and agricultural field has in recent years bought about a revolution both in the marketing of produce through large supermarket chains and in the systems for treating and preparation of produce before it is put on the market. Today, produce upon harvest is sent to large clearinghouses where quantities of produce measured in tons are sorted by quantity, quality and size, and are then washed, disinfected, chemically protected and packaged in boxes, cartons or supermarket net bags.

Typical of the various apparatus present in the art for handling fruits and vegetables is the apparatus shown in U.S. Pat. No. 2,517,942 issued to Ten Eyck, the apparatus shown in U.S. Pat. No. 3,319,639 issued to Anderson, and the apparatus shown in U.S. Pat. No. 3,499,687 issued to Ellis. Due to increases in costs of labor, the difficulty in finding qualified personnel and the increase in quantities every produce clearinghouse or produce treatment center now has to deal with, the concept of automation, such as present in the above described patents, has been introduced in forms designed to meet a double requirement. This double requirement is (1) to automate some operations thus eliminating the labor so employed, and (2) to make manual labor more efficient thereby improving the productivity of personnel which are not replaceable with machines.

The first step of general present day practice, which is used in the treatment of apples, pears, citrus fruits, peaches, tomatoes, peppers, cucumbers and potatoes, among other fruits and vegetables, is to subject the product to cleansing to eliminate or reduce any residue of powder, soil, or chemical treatment given to the product in the growing field. This is the first step in an overall process of cleaning the produce. Another step is to treat the product with a disinfectant such as a chosen fungicide or germicide which is suitable for this purpose. A third step in treating the produce is to coat the produce with an artificial wax to assure protection against loss of weight and detoriation of taste, primarily due to dehydration. A fourth step in treating the produce is to sort it by quality and color. This process is generally known as selection and can be carried out all at once or serially, that is, sorting by color can be done after sorting by quality. A fifth step in the treatment of the produce is to sort the produce according to size, separating the produce into several runs of fruits or vegetables (generally from 6 to 8 runs) each of which has within it fruits and vegetables of about the same size. The technical name applied to this step is "calibration". A sixth and usually final step in the general practice of treating produce, is to package the produce in the final container used for shipping it commercially. These containers might be wooden boxes, cartons, net bags, or plastic bags. This packaging operation is today sometimes carried out on automated equipment with a capacity varying from a minimum of 5 tons per hour of produce to a maximum of 30 tons per hour of produce. The intermediate steps described immediately above are not generally performed in any set sequence.

Generally, the chemical treatment such as washing, disinfecting and waxing the produce is now done automatically with no manual aid. Additionally, calibration or sorting by size is generally done exclusively by machine. However, the operation of selection or sorting by quality of the fruit and packaging of the fruit is at present largely done manually, by treained workers. Naturally, automation in this area is desirable also.

The continuous push of the agricultural industry towards automation presents serious problems because in the agricultural industry, the products are not standard but are natural products which are always subject to unpredictable differences in quality, ripeness and size. Consequently, machinery suitable for automatically handling natural products is very difficult to design and manufacture because the flexibility of the machinery must be able to deal effectively with the variability of the products which the machinery processes.

One approach to avoiding these problems or at least minimizing the problems of dealing with non-uniform natural products, is to design the machinery with design parameters far surpassing the apparent need, such as by tripling, in some instances, the size of the equipment, in order to be able to deal with extreme conditions. For example, measurements of the ratio of the quality of two different batches of fruit may vary from 90/10 to 10/90. Such a design solution of providing greatly redundant capacity is extremely costly, however, because the investment in machinery is much, much too high. In addition, when the productivity of the machinery on a unit basis is lowered by over-designing it, the productivity of the personnel to do the necessary manual labor in conjunction with these machines is lowered as well.

Typical problems heretofore connected with the processing of produce following a sequence such as described above, wherein selection and packaging is carried out manually, are as follow. First, it is not possible to measure out the correct dosage of chemicals as a function of the weight of the produce, since the correct dosage of chemicals is generally dependent upon the surface area of the fruit to be treated and there may not be a direct correspondence between weight and surface area of the fruit due to variations in internal densities of the fruit. Second, it is generally not possible to calibrate and stack the second quality fruit which has been discarded on the selection counter, at the same time the first quality fruit is being packed, due to volume storage limitations in equipment being used. Consequently, this makes it necessary either to double the equipment down the selection lines to accommodate second quality fruit for processing or to let the second quality fruit accumulate in boxes until the first quality fruit is all calibrated and packed whereupon the second quality fruit can be calibrated and packed. Third, when selection is done prior to calibration, the capacity of the calibrator and of the packing counters may be reduced by a percentage depending upon the quantity of second quality fruit discarded during the selection process. This sometimes can result in a necessity of using the calibration equipment at less than 50% of its capacity. A fourth disadvantage is the requirement of enormously oversized packing counters. This requirement is due to the possibility of the incoming fruit being all of the same size, in which case, the entire quantity must be packed on a single counter.

Since specifications in chemical treatments of fruits and vegetables frequently require that residues be maintained near a maximum level, calibration of the produce before chemical treatment thereof allows maintenance of the level of chemical residues remaining in the fruit to be kept constant.

A partial solution to the problems delineated above can be obtained by inserting, after calibration, systems for dry accumulation of already accumulated produce, utilizing a system for every size of fruit in such a way to ensure a certain continuity in the packing operation. However, these dry accumulation systems have a major disadvantage in that the produce can only be stored in a dry condition, prior to chemical treatment, for a very limited time before spoilage begins.

OBJECTS OF THE PRESENT INVENTION

It has been found, rather surprisingly, that accumulation of fruits and vegetables in water for extended periods is possible and that fruit and vegetables can be kept in water for several days without problems, if a fungicide or a germicide and a certain amount of salt are added to the water so as to obtain an isotonic solution, i.e., one having a concentration of fungicide or germicide and salt comparable to the concentration on the outer part of the immersed produce. Accordingly, it is an object of the present invention to provide an apparatus for facilitating sequential washing, calibration, accumulation, selection, fungicidal or germicidal treatment, waxing and packing of fruits and vegetables while permitting the accumulation in water of the fruits and vegetables as they are selected or calibrated.

It is a further object of the present invention to provide a system for the accumulation of quantities of fruits and vegetables without creating a build-up in the areas where the fruits and vegetables must be processed by hand and without compressing the fruits and vegetables by forcing them into pressing contact with one another.

It is a further object of the present invention to provide an accumulation system for fruit and vegetables in accordance with the foregoing objects which allows the extraction of the fruit or vegetables from the place where they have been accumulated for delivery to a packing counter.

It is a further object of the present invention to provide a system and apparatus for addition of bactericidal and germicidal compositions to an aqueous medium in which fruits and vegetables are accumulated thereby allowing application of the bactericidal and germicidal compositions via the aqueous medium rather than by applying the bactericidal and germicidal compositions directly to the fruit or vegetables.

It is a further object of the present invention to embody a system for accumulating fruits and vegetables for storage in water whereby the undesirable effects of the stacking of produce on produce, thereby crushing the produce, are avoided.

It is a further object of the present invention to provide a single tank with moveable walls and free passage of water so that the space allotted to storage compartments for fruits and vegetables within the tank be not fixed but be able to be adapted automatically to the percentage quantities of the sizes of the fruit to be contained in the compartment.

It is a further object of the present invention to provide a basin for the storage in water of fruits and vegetables which have been calibrated or sorted according to size, with the basin having moveable walls, with an automatic system for the flushing of compartments in the basin to avoid having the fruits and vegetables standing too long in the water, and with the basin having an automatic system for taking out the fruits and vegetables and sending them to an area for chemical treatment and subsequent packaging.

It is a further object of the present invention to provide an apparatus for the storing of second choice produce, which has been sent back to appropriate compartments of a basin, after having been rejected on a selection counter, with the basin containing water having germicidal and herbicidal products and having salt therein in order to obtain a saline solution capable of affecting the maintenance of the produce.

It is a further object of the present invention to provide an apparatus to separately treat by chemical means several sizes of produce in order to adjust the quantity of chemical treatment for each size being treated, so as to have a residue of chemicals in the water proportional to the weight of the produce being treated.

DESCRIPTION OF THE PREFERRED EMBODIMENTS

Figure 1:
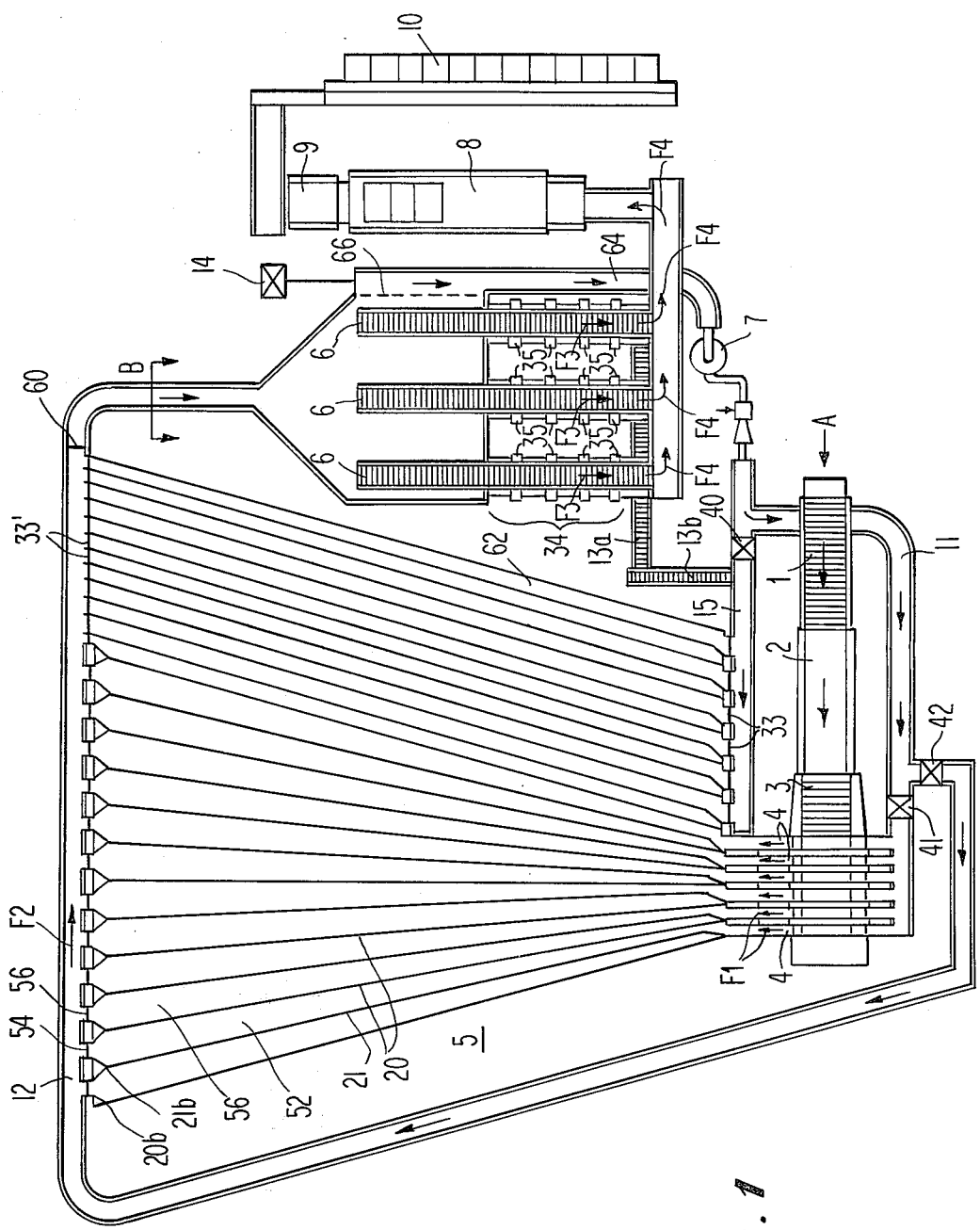
FIG. 1 is a plan view of the apparatus of the present invention with no produce contained in the apparatus of the present invention.

Referring now to FIG. 1, the apparatus of the present invention has initially a first feeding conveyor belt designated as 1, upon which the produce is initially loaded from the direction designated as A. A washer element designated 2 takes the produce from the first feeding conveyor belt 1, washes it, rinses it and predries it. A calibrating machine 3 performs the selection of the produce according to the size of the produce. This calibrating machine is of a kind well known in the art and the details of the operation of the calibrating machine do not comprise any portion of the present invention.

In the embodiment of the apparatus of the present invention shown in FIG. 1, the apparatus is set to handle six classes of sizes of produce. However it is to be understood that the present invention is not limited to the handling of any one number of classes of size of fruit. For each class of size, there is provided a channel in which water runs for carrying the produce, which has been sorted by size into the storage spaces in a basin designated generally as 5. The channels leading from the sorting or calibrating machines to the basin 5 are indicated as 4 and the displacement of the produce occurs in the direction indicated by the arrows F1.

Figure 2:
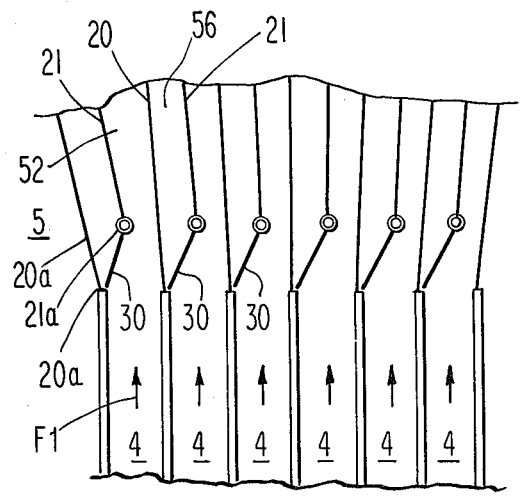
FIG. 2 is an enlarged detail view of a number of exit channels and selection gates where the produce exits from the sorting machine and enters into the accumulation basin of the present invention.
Figure 3:
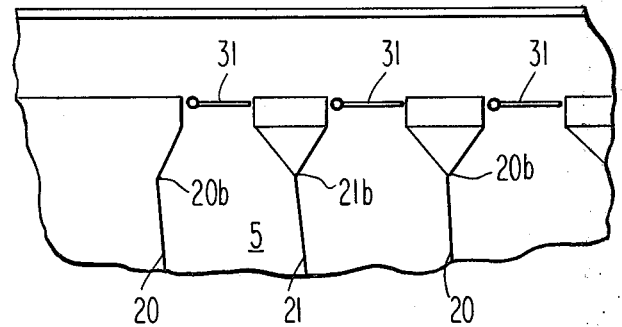
FIG. 3 is an enlarged detailed view of the exit gates from the accumulation basin through which the produce exits the accumulation basin for travel towards the selection and packing area.

The basin 5 is divided into compartments which are separated one from another by a plurality of moveable, flexible walls designated typically as 20 and 21. Each of the moveable, flexible walls 20 and 21 is preferably made either of a net, woven or non-woven, or some other flexible material and is fastened at the two ends similar to 20a and 21a as shown in FIG. 2 and similar to the ends 20b and 21b as shown in FIG. 3. These moveable walls are structured so as to be expandable almost indefinitely within the border of the basin 5. The structure of the moveable, flexible walls 20 and 21 is not shown in detail because any suitable material means can be used for the manufacture of these walls.

When the apparatus of the present invention is used, the basin 5 is divided using the walls 20 into a number of compartments corresponding to the number of classes of sizes of produce provided by the sorting machine 3. Each main compartment defined by the walls 20 is in turn divided into two compartments by a moveable, flexible, elastic wall 21. These two compartments comprising the main compartment by controlling gates designated as 30 in FIG. 2, may be optionally connected alternately with an output channel designated as 4 of the sorting machine 3. This is for the twofold purpose of separating produce of a given origin from produce arriving subsequently which is of different origin, and for storing the produce in the compartment designated to receive that same size of fruit. Also, by controlling the gates 30, if the gates are chosen to be manufactured of a solid, water-tight material, one can insure an adequate flow of water through the basin 5, and thus be sure that produce does not remain in any storage compartment bounded by the walls 20 and 21 when it is desired to evacuate all produce from the storage compartment. It is to be understood that all the gates designated as 30 open and close at the same time. The gates when open, receive the sized produce from the calibrator apparatus 3 through the flow passageways 4.

The basin is preferably made of such a size as to allow it to be filled with water to a depth of approximately of 1 meter, with the depth of the surrounding channel, designated generally as 12, preferably of about 1.4 meters. The total volume of the basin should be such as to be able to contain all the produce which can be processed in the processing area, which is generally designated by the arrows B, in 2 days.

Typically, if it were desired to design a system capable of handling a volume of produce of approximately 10 tons per hour, and allowing 8 working hours per day, the basin should contain 160 tons of fruit, which would be the capacity of the system to handle in 2 days. Assuming a depth of one meter and a content of the basin 5 of 50% fruit and 50% water to contain the 160 tons of fruit, a surface area of 320 square meters would be required for the basin 5.

The water in the basin 5 is preferably treated with hypochlorite of sodium with a concentration in the basin 5 varying from 50 to 400 ppm. Additionally, an appropriate fungicide for the particular type of fruit being accumulated may be utilized with salt added so as to achieve a total saline concentration so as to balance the existing concentration already present on the outer part of the fruit being processed. Other bactericides which can be used include calcium hypochlorite, lithium hypochlorite, alanide and chloramine T. These materials are used at a pH of about 7 by using buffers of a mixture of monosodium phosphate and bisodium phosphate.

The addition of chemicals and additional water for maintaining the water level is performed by means of a metering control designated generally as 14. Excess water in the basin may be discharged through an overflow valve or trough.

It is to be understood that the gates 30 and 31 shown in FIGS. 2 and 3 are remotely controlled using conventional suitable actuation and control means. The exit of produce from the basin may be accomplished by opening one of the gates 31 via remote control, with the system for controlling the gates operational to only open a given gate at a given time, thus preventing the opening of a second gate. Also, gates 33 are provided for the inlet to the basin 5 of fruit which is determined to be of the second choice, once the selection process is performed in the area generally designated by the letter B. The appropriate gate of those designated as 33 on the opposite side of the basin is opened at the same time as is the corresponding gate 31, so that fruit of the size class which it has been chosen to process, which has been rejected as second choice fruit during the processing, can be accumulated in the basin. It is to be understood that in place of the gates 31, roll conveyors could be used so as to give a more uniform flow of produce out of the accumulator. These roll conveyors are well known in the art and consequently no further discussion of them is deemed warranted here.

The operation of the improved system for the handling of fruits and vegetables is illustrated as follows. Assuming the treatment of given lot of produce, the produce is loaded on the conveyor belt 1 in the direction designated by the arrow A and is transported to the cleaner 2 where the produce is cleaned. The produce then proceeds to the selector apparatus 3 in which it is sorted by size and is ejected, in various batches by size through the pathways designated 4, in such a way that the half compartments which are defined between the walls 20 and 21 are filled with fruit or vegetables according to the various sizes. The walls 20 and 21 can expand in order to accommodate the various quantities of the various sizes of fruits and vegetables. While at the stage of sorting the produce and placing it into the basin 5 for storage, it is possible to begin manual selection of the produce. This is done by opening the appropriate one of the gates 31 as illustrated in FIG. 3 whereby the water stream which runs in a channel 12 will carry the produce of the particular chosen size towards a plurality of conveyor means designated as 6. Personnel working in the area designated as 34 perform hand selection of first and second choice produce of the particular size which is being processed due to the opening of one of the gates 31. Assuming the personnel are selecting produce which is first choice, i.e., top quality, this top quality or first choice produce goes along the conveyor 6 in the direction of the arrows F2 and F4 thereby arriving at an apparatus designated as 8 for waxing and fungicidal treatment of a kind conventionally applied to produce. From there, the selected first quality fruit travels via conveyor to a labelling apparatus designated as 9 and finally to a series of stations designated as 10 where manual or automatic packaging of the produce can be performed. It is to be understood that the apparatus for performing the waxing and fungicidal treatment 8 and the labelling apparatus 9 are well known in the art and the details of the operation of these apparatus do not comprise any part of the present invention.

Produce which does not pass the quality test during selection by the workers in the stations designated by the area 34, i.e., second choice produce, is placed by the operators working in the area designated as 34 into holes designated as 35 through which this second choice produce falls onto a conveyor, which is not shown in the drawing, for transport to the conveyors designated as 13a and 13b. Conveyors 13a and 13b discharge the second choice produce into channel 15 wherein a water stream runs similar to that of channel 12, so that the second choice produce can enter again into the basin 5, into the part of the basin arranged for second choice produce, upon the opening of one of the gates designated as 33. Typically, this second choice produce would enter the container in the basin designated as 62.

As has been described above, several water flow channels are arranged in the system such as those designated by the numbers 15, 11 and 12 through which streams of water run for moving the produce which is being processed. The water is put in motion through the open channels at the desired rate by means of a pump designated as 7 fed by the channel 64 which collects water through the filter 66 from the small collection basin designated as 50 wherein the channel 12 discharges. Control of the passage of water in the channels 11, 12 and 15 is affected with conventional sluice gates 40, 41 and 42.

During the initial loading of produce into the apparatus, sluice gates 40 and 42 are closed and sluice gate 41 is open so as to provide washing water flowing through the sorting machine 3. Sluice gate 42 is then opened to allow water to run through the channel 12. Generally, when sluice gates 40 and 42 are open, sluice gate 41 will be closed and visa versa.

During the operation of the accumulation system of the present invention, when a sufficient quantity of fruit of a single size has accumulated in a respective compartment of the accumulator basin 5, for instance in the compartment designated as 52, the exit door designated as 54 to the channel 12 would be opened and fruit of the chosen size which has been accumulated in the compartment 52 will be pushed on by the current of water in channel 12, which is produced by the pump 7, towards the next phase of handling. When compartment 52 is empty and more fruit is needed to process, door 54 is closed and a second door, such as door 58, is opened thereby allowing fruit from the compartment designated 56 to be circulated through channel 12 and into the processing area designated generally by the arrow B. It is not necessary to wait until the last portion of the machine is empty of the first batch of produce to open a door or gate allowing a second portion of produce to be moved towards the processing area, because while the first portion of produce, such as that from compartment 52 is being processed, the second portion of produce can be already well along in the transport channel 12. An optionally openable and closeable gate 60 can be provided so as to maintain the second lot of fruit or produce separated from the first lot of produce.

In order to minimize the interval of time which must be provided between different lots of produce, generally the capacity of the selection counters and the chemical treatment stage is generally designated to be slightly larger than that of the packing counter area 10.

Conventionally, it is desirable to have the packing counter area designated as 10 to be the portion of the processing line which has an absolute regularity of feeding, particularly when an automatic packing system is used, in order to avoid work interruptions which adversely affect productivity. In the present system, substantially absolute regularity of the flow of produce to the packing area is provided through automation in feeding the packing tables 10 from the work stations in the area designated generally as 34.

Specifically, to provide for continual flow of produce to the packing counter, a feed back system, sensing the weight of the produce on the counter, a photo-electric cell system sensing the parts of the counters occupied by fruit, or a similar system can be used to continually control the flow of fruit either by controlling the opening and closing of the exit doors such as 54 and 58 or by controlling a degree of opening of the valves 40, 41 and 42 which regulate the quantity of water sent to the different sectors of the system by the pump 7 and hence control the flow rate of the produce through the system. Such an automatic system of control of the flow of produce to the packing stages is the ideal solution in the case where machines for automatic packing are utilized.

It is to be understood that the dimensions of the accumulation basin designated generally as 5 can be varied greatly, depending upon the degree of flexibility it is desired to design into the system. As a general rule, it is desirable to have the accumulation basin sufficiently large to hold an amount of fruit suitable for several days of packing operation, with the amount of fruit being limited by the length of time the fruit can stay in the water bath without adverse effects.

I claim the following:

1. A system for the accumulation, handling and treating of produce comprising:
    a. means for feeding produce into the system;
    b. means for the preliminary washing and sorting according to size of the incoming produce;
    c. means for directing the size sorted produce into a basin filled with water;
    d. a basin having a plurality of compartments therein, each compartment having moveable walls within said basin;
    e. a plurality of first gate means for controlling the sending of size sorted produce into a first plurality of moveable wall compartments in said basin;
    f. a plurality of second gate means for individually controlling the exit of produce from each of said moveable wall compartments, one compartment at a time, into a transport channel;
    g. a transport channel having water flowing therein for transporting said produce towards selection, treatment and packaging counters;
    h. a plurality of third gate means for directing selected produce into a plurality of second moveable wall compartments in said basin;
    i. conveyor means for conveying size sorted produce past work stations where workers can sort said produce by quality;
    j. conveyor means for conveying said selected out produce to a germicidal produce treatment apparatus;
    k. a germicidal produce treatment apparatus for applying a germicide to a selected produce;
    l. a waxing apparatus for receiving said produce from said germicidal produce treatment apparatus and for applying wax to said produce;
    m. transport apparatus for transporting said produce to a packing area; and
    n. interconnecting water channel means for transporting said produce between said basin and said stations where quality selection is performed, and back to said basin.

2. The system of claim 1, wherein said water in said collecting basin and said transport channels is substantially isotonic with respect to the transported produce.

3. The system of claim 2 wherein said water is a solution of sodium chloride.

4. The system of claim 3 further comprising a bactericide in solution with said water.

5. The system of claim 1 further comprising a fourth gate means for optionally permitting and preventing the sending of selected produce towards treatment and packing counters.

6. Apparatus for the handling and treatment of produce comprising:
 a. means for feeding produce into the apparatus;
 b. means for receiving said produce fed into the system and for washing said produce;
 c. means for sorting said produce into classes according to size, said means being connected to said means for receiving and for washing said produce;
 d. means for accumulating said produce after said produce has been sorted into classes according to size, said means for accumulating said produce being suitably adapted for maintaining accumulated produce in a condition whereby it is segregated by the size classes into which it was sorted;
 e. means for transporting said produce, one size class at a time, to at least one processing area;
 f. at least one processing area having at least one means for transporting produce past a work station where a worker may segregate first choice produce from second choice produce on the basis of the quality of the produce;
 g. means for transporting said second choice produce back to said means for accumulating produce;
 h. means for transporting said first choice produce to a waxing and fungicidal produce treatment apparatus;
 i. a waxing and fungicidal produce treatment apparatus;
 j. a produce labelling apparatus; and
 k. means for conveying produce away from said produce labelling apparatus.

7. The apparatus for the handling and treatment of produce of claim 6, wherein said means for accumulating said produce after said produce has been sorted into classes according to size, said means for accumulating said produce being suitably adapted for maintaining accumulated produce in a condition whereby it is segregated by the size classes into which it was sorted, further comprises:
 a. a first plurality of gate means connected to said means for sorting said produce into classes according to size, each of said plurality of gate means being optionally moveable between two positions, a first position being such that produce of a given size passes into one of two flexible wall compartments corresponding to one of said plurality of gate means in said means for accumulating produce, said second position of said gate means being a position such that said produce will pass into a second said compartment of said means for accumulating said produce, wherein each one of said plurality of gate means is connected with said means for sorting produce according to size such that each gate feeds therethrough produce of a different size;
 b. a second plurality of gate means, one each of said gate means for allowing the escape therethrough of produce of a given size which has been stored in either a first or a second one of said compartments in said apparatus connected to a first one of said first gate means;
 c. third gate means for receiving therethrough produce which has been selected as second quality produce;
 d. a first plurality of flexible means, disposed between said first plurality of gate means and a portion of said second plurality gate means, said first plurality of flexible means forming in combination with said first plurality of gate means and said portion of said second plurality of gate means, a plurality of flexible walled compartments for the accumulation of produce, which has been sorted by size, therein;
 e. a second plurality of flexible means disposed between said third plurality of gate means and a remaining portion of said second plurality of gate means, said second plurality of flexible means forming in combination with said third plurality of gate means and said remaining portion of said second plurality of gate means, a plurality of flexible walled compartments for the accumulation of produce, which has been sorted by size and which has been initially removed from a larger portion of produce on the basis of being of lesser quality, therein.

8. A method for the accumulation and processing of produce comprising the steps of:
 a. feeding a batch of produce into a produce cleaning, sorting, accumulating, labelling and sanitizing apparatus;
 b. cleaning the batch of produce;
 c. sorting the batch of produce into a plurality of groups of produce such that each group of produce consists of produce of substantially the same size produce items;
 d. accumulating said produce comprising each of said group of produce items separately, in a water solution chemical treatment bath;
 e. feeding said plurality of groups of produce, seriatum, to a selection area via a chaneled water solution chemical treatment bath;
 f. separating each group of said produce into subgroups of first quality produce and second quality produce;
 g. conveying said subgroup of first quality produce to a labelling apparatus;
 h. labelling each item in said subgroup of first quality of produce using said labelling apparatus;
 i. waxing each item in said subgroup of first quality produce with wax using a waxing apparatus;
 j. packing said items in said subgroup of first quality product for shipment;
 k. feeding said subgroup of second quality produce into an accumulation basin;
 l. accumulating each said subgroup of said second quality produce in such a manner that each said subgroup of produce which is accumulated consists of second quality produce of a size according to the sizes into which said batch of produce was originally sorted;
 m. feeding said plurality of subgroups of second quality produce, seriatum, into a selection area via a chaneled water solution chemical treatment bath;

n. labelling each item in each said subgroup of second quality produce using said labelling apparatus;
o. waxing each item in each said subgroup of second quality produce with wax using a waxing apparatus;
p. packing said items of second quality produce for shipment.

* * * * *